United States Patent [19]

Sassa et al.

[11] Patent Number: 4,830,643

[45] Date of Patent: May 16, 1989

[54] EXPANDED POLYTETRAFLUOROETHYLENE TUBULAR CONTAINER

[75] Inventors: Robert L. Sassa; Christian E. Bailey, both of Newark, Del.

[73] Assignee: W. L. Gore & Associates, Inc., Newark, Del.

[21] Appl. No.: 218,779

[22] Filed: Jul. 13, 1988

[51] Int. Cl.⁴ ............................................. B01D 50/00
[52] U.S. Cl. ........................................ 55/316; 55/387; 55/389; 55/522; 55/528
[58] Field of Search ....... 210/502.1; 55/316, 387–389, 55/528, 522

[56] References Cited

U.S. PATENT DOCUMENTS

| | | | |
|---|---|---|---|
| 3,911,080 | 10/1975 | Hehl et al. | 428/35 |
| 3,990,872 | 11/1976 | Cullen | 55/389 |
| 4,332,845 | 6/1982 | Newata et al. | 423/210 |
| 4,772,300 | 9/1988 | Cullen et al. | 55/387 |

FOREIGN PATENT DOCUMENTS 7415  1/1987  Japan ..................... 55/387

*Primary Examiner*—Bernard Nozick
*Attorney, Agent, or Firm*—Gary A. Samuels

[57] ABSTRACT

A container for adsorbing components present in an environment, which comprises a tubular structure of expanded, porous polytetrafluoroethylene sealed at both ends, so as to encapsulate an adsorbent present with the tubular structure.

11 Claims, 1 Drawing Sheet

EXPANDED POLYTETRAFLUOROETHYLENE TUBULAR CONTAINER

FIELD OF THE INVENTION

This invention relates to a novel tubular container having an adsorbent material inside, and more specifically, to a novel container having very small pores in its walls that allow it to be permeable to gases, selected liquids and solutes, but impermeable to other larger size materials and other selected liquids.

BACKGROUND OF THE INVENTION

Containers that contain adsorbents to remove vaporous impurities in the atmosphere are well known. For example, they can be used to remove water vapor from air to obtain or maintain a dry atmosphere in applications where a moisture-free atmosphere is important, as for example in keeping hygroscopic materials dry. Another example is the removal of organic vapors from air to avoid contamination of local environments sensitive to such vapors, as for example in preventing head (stiction) failures in computer disk drives.

It is well known that greater effectiveness in removing of material from the atmosphere by adsorption can be obtained if the surface area of the adsorbent is maximized. Thus the smaller the adsorbent materials in particle size, the greater the effectiveness in removing impurities. Unfortunately, the smaller the particle size, the greater amount of dust-like fines that can be present. Moreover, even coarse adsorbent materials generate fines by mutual abrasion of the coarse granules.

To protect the adsorbent particles, a protective porous material i.e., a material that permits passage through it of gaseous components or other components is usually employed to surround and encase the adsorbent. But if the pores of the protective material are too large, the fines of the adsorbant material will escape through the pores and contaminate the outside environment. To prevent such escape, it is desirable for the protective covering to have pores small enough to prevent escape of very small diameter fines, i.e., fines on the order of 10 microns, or even 1 micron or less in size.

SUMMARY OF THE INVENTION

This invention provides an adsorbent-containing device having such a protective covering. The device comprises a container for selectively adsorbing gaseous components present in an environment, which container comprises a tubular structure of expanded, porous polytetrafluoroethylene, said tubular structure being sealed at both ends, so as to encapsulate an adsorbent present within the tubular structure, the pores of said porous polytetrafluoroethylene having an average size of between about 0.1 and 1 micron, with substantially no pores greater than 5 micron in size.

DESCRIPTION OF THE INVENTION

Figure 1:
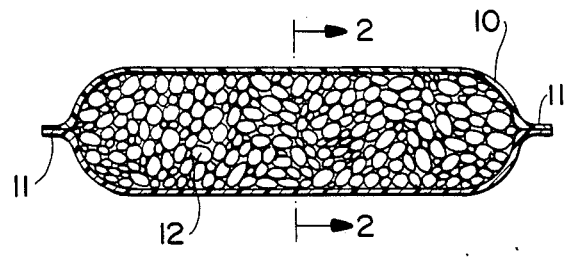
FIG. 1 depicts an embodiment of the tubular container of the present invention, cut away to expose the interior of the tubular container with adsorbent particles inside.
Figure 2:
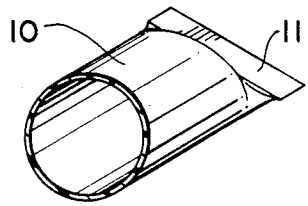
FIG. 2 is a view of the tubular container cut along line 2—2 of FIG. 1, but without having any adsorbent particles inside.

Refering to the FIGURES, the tubular container of the invention comprises a tube 10 made of expanded porous polytetrafluoroethylene sealed at each end 11 so as to enclose adsorbent particles 12.

The tube can be slightly to very flexible, depending on the strength of the polytetrafluoroethylene and the thickness of the walls. For most applications, the wall thickness will be between 10 and 50 mils (250-1250 micron) on average. The expanded porous polytetrafluoroethylene tube is made according to the procedures described in U.S. Pat. Nos. 4,110,392, 4,187,390, 4,075,679 and 3,953,566. More specifically, coagulated dispersion polytetrafluoroethylene (PTFE) is lightly lubricated and extruded as a paste through an annular-die extruder. In a series of heating and stretching steps the lubricant is evaporated away and the PTFE structure is expanded such that the percent void space or porosity is finally about 30-80%. The resulting tube is sintered by heating above the crystalline melt temperature of PTFE. Under one set of conditions such a tube is made having an inside diameter of 0.079 inches, a wall thickness of 0.016 inches, pores of maximum size 2.0 $\mu$m, 50% porosity, and air permeability through the wall of 0.005 cm/sec at 1.27 cm $H_2O$ P. Under different conditions a tube is made inside diameter 0.50 inches, a wall thickness of 0.039", a maximum pore size of 3.5 $\mu$m and a porosity of 70%.

In operation, once the tube is prepared, it is sealed at one end by any suitable sealing means. For example, heating sealing can be carried out by using an adhesive such as polyethylene, or a melt-processable tetrafluorethylene copolymer, and heating and compressing the end of the tube to result in the configuration shown in the drawings or simply fusion bonding the tube to itself. An alternate method is to seal one end by means of a plug that is snuggly fitted in the end.

The tube is then filled with an adsorbent particulate, such as silica gel, activated carbon, calcium sulfate, calcium carbonate, activated alumina, molecular sieves or the like. The remaining open end is then sealed in a manner like the other end.

In practice, an adsorbent-filled tubular container made of expanded porous polytetrafluoroethylene, about two inches long, 0.6 inch diameter and 0.5 inch inside diameter filled with 5 grams anhydrous $CaSO_4$ (Calcium Sulfate) was used to adsorb water vapor from the interior of a 9 liter sealed glass jar. The relative humidity inside the jar was reduced to 20% RH from an initial 60% RH with the addition of the adsorbent tube.

Pore size is measured by microscopy.

Porosity (% void space) is measured by density (weight per volume) measurements.

We claim:

1. A container for selectively adsorbing components present in an environment, which comprises a tubular structure of expanded, porous polytetrafluoroethylene, said tubular structure being sealed at both ends so as to encapsulate an adsorbent present within the tubular structure, the pores of said polytetrafluoroethylene having an average size of between about 0.1 and 1 micron, with substantially no pores greater than 5 micron in size.

2. The container of claim 1 wherein the adsorbent is calcium sulfate.

3. The container of claim 1 wherein the adsorbent is activated carbon.

4. The container of claim 1 wherein the adsorbent is silica gel.

5. The container of claim 1 wherein the adsorbent is calcium carbonate.

6. The container of claim 1 wherein the adsorbent is activated alumina.

7. The container of claim 1 wherein the adsorbent is molecular sieves.

8. The container of claim 1 wherein the ends of the tube are sealed with an adhesive.

9. The contain of claim 1 wherein the adsorbent is sealed by fusion of PTFE to PTFE.

10. The container of claim 1 wherein the average wall thickness is between 10 and 50 mils.

11. The container of claim 10 wherein the length of the container is between 0.25 and 20 inches.

* * * * *